United States Patent

Paine et al.

[15] 3,662,973
[45] May 16, 1972

[54] FLIGHT CONTROL SYSTEM

[72] Inventors: Thomas O. Paine, Administrator of the National Aeronautics and Space Administration with respect to an invention of; William A. Collins, 2691 Park Boulevard, Tonawanda, N.Y. 14150

[22] Filed: July 31, 1970

[21] Appl. No.: 59,966

[52] U.S. Cl............................................244/23 A, 244/1 SA
[51] Int. Cl...........................................................B64c 29/00
[58] Field of Search......................244/1 R, 1 SA, 1 SS, 23 R, 244/23 A

[56] References Cited

UNITED STATES PATENTS

| | | | |
|---|---|---|---|
| 2,981,501 | 4/1961 | Schaefer | 244/23 A |
| 3,045,953 | 7/1962 | Eggers | 244/23 A |
| 3,506,221 | 4/1970 | Caillette | 244/23 R |

*Primary Examiner*—Richard E. Aegerter
*Attorney*—Marvin J. Marnock, Marvin F. Matthews and John R. Manning

[57] ABSTRACT

Thrust control apparatus for a spacially movable object such as an air or spacecraft, wherein the roll movements of the craft are controlled through differential throttling of a plurality of thrust engines, and wherein the pitch and yaw movements of the craft are controlled by pivotable movements of the thrust engines. Such apparatus is relatively simple in terms of hardware and operational usage, and it is especially suitable for manned lunar flying and landing in the exploration of the moon after the initial lunar landings from "Apollo" type space vehicles.

The apparatus has a trimming mechanism to handle a variety of loading conditions on the spacecraft, without changing the position of the operator's controllers.

16 Claims, 10 Drawing Figures

Patented May 16, 1972
3,662,973
4 Sheets-Sheet 1
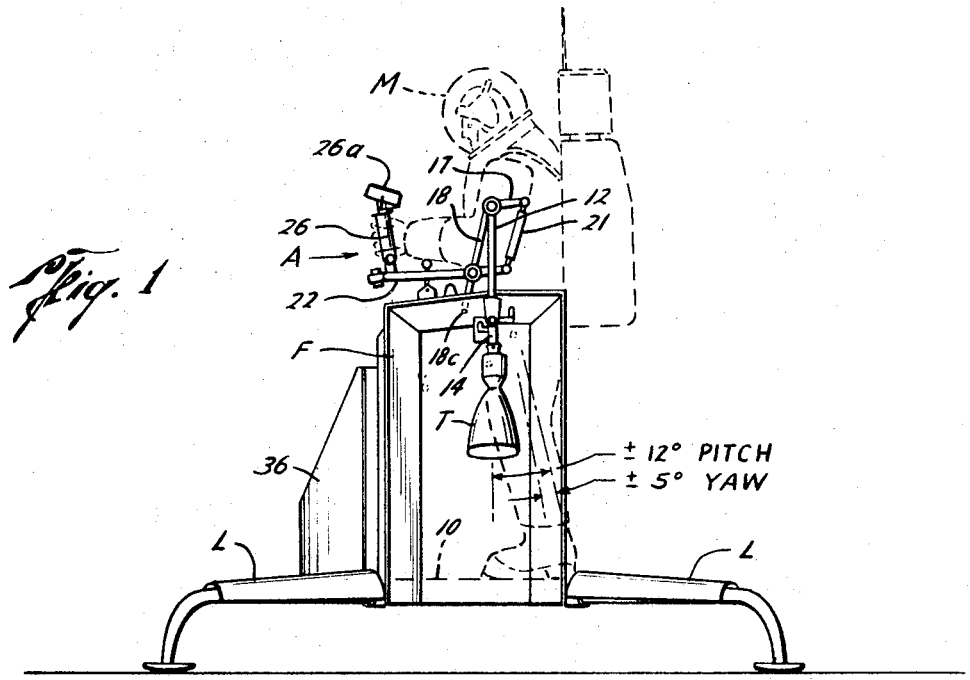
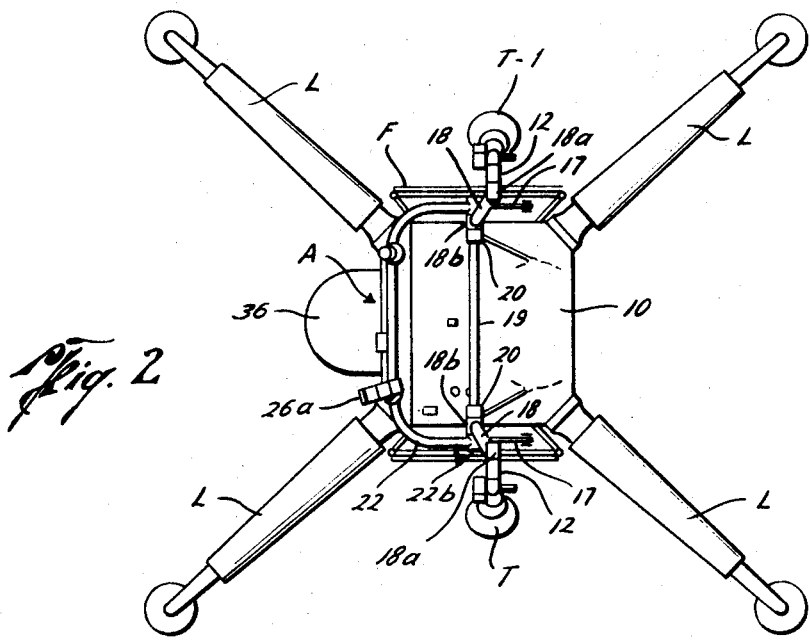
William A. Collins
INVENTOR
BY
ATTORNEY Patented May 16, 1972 3,662,973

William A. Collins
INVENTOR.

BY

ATTORNEY

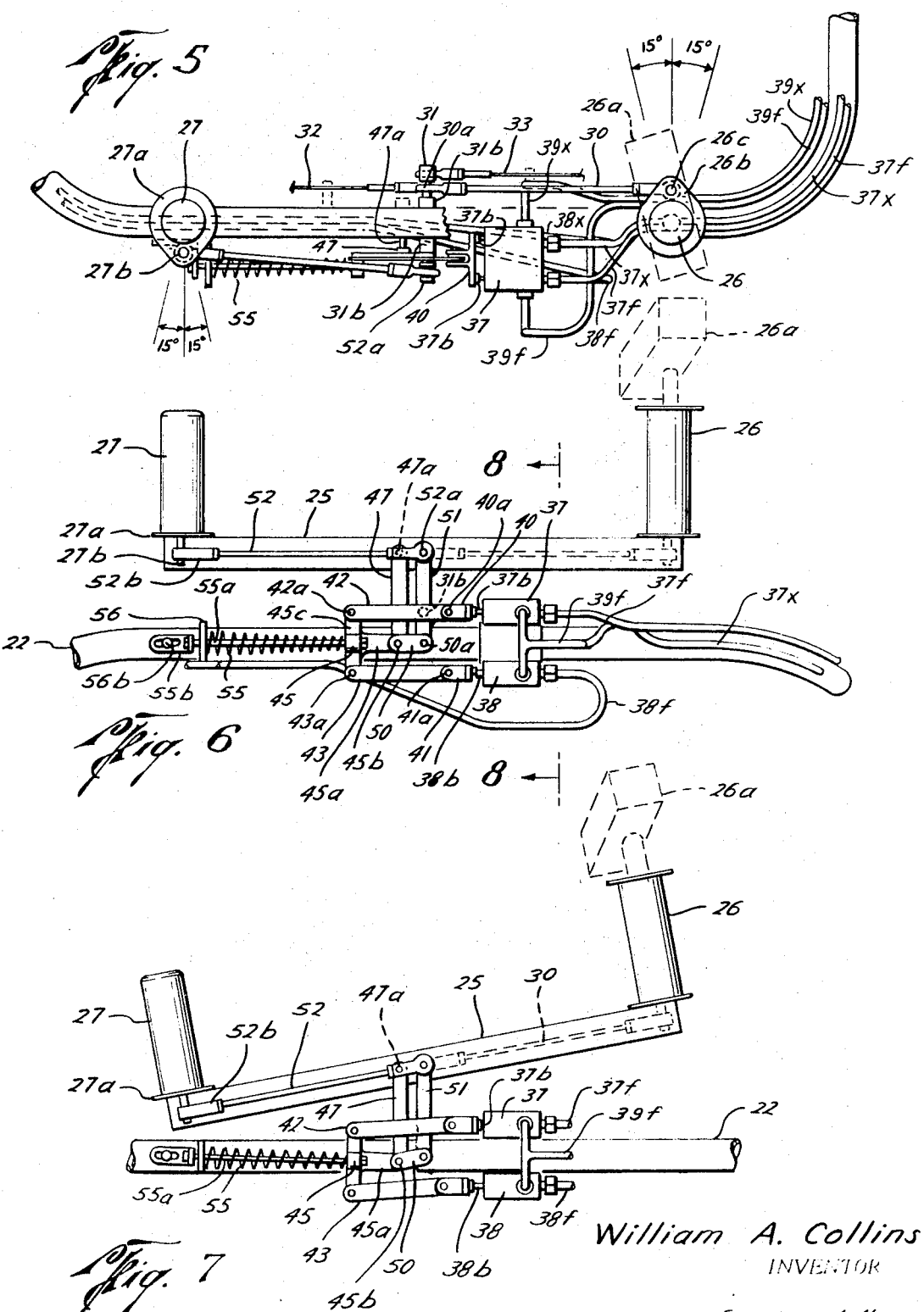

William A. Collins
INVENTOR

BY

ATTORNEY

FLIGHT CONTROL SYSTEM

The invention described herein was made in the performance of work under a NASA Contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The field of the present invention is thrust control apparatus for a spacially movable craft.

2. Brief Description of the Prior Art

In the past, various efforts have been made to provide spacial vehicles or craft with control systems which are relatively simple in terms of hardware and operation. See, for example, U.S. Pat. Nos. 2,509,603; 2,943,816; 2,981,501; 2,989,271; 3,362,495; and 3,410,504.

Such prior art relies upon physical movements of the thrust units for controlling the directions of movement of the space craft or vehicle, with the result that either control of the craft with respect to pitch, yaw and roll was not obtained, or the control apparatus was not satisfactory for practical use with respect to pitch, yaw and roll of the craft.

SUMMARY OF THE INVENTION

The present invention controls the pitch, yaw and roll movements of a space craft by physically manipulating a plurality of primary thrust engines to control the pitch and yaw of the craft, and by differential throttling of the thrust engines to control the roll of the craft, with each thrust engine being pivotable in a predetermined plane to obtain such control in all directions, so that a simplified, practical control apparatus with simplified operation is provided. Additionally, means are provided for selectively positioning the pivot axis of the primary thrust engines to preset the pitch trim of the craft in accordance with varying load distribution on the craft.

These and other features and advantages of the present invention will be more fully evident from the following specification, drawings and claims.

BRIEF DESCRIPTION OF THE DRAWINGS

FIG. 1 is an elevation illustrating the control apparatus of this invention mounted on a lunar vehicle, with a man illustrated in dotted lines;

FIG. 2 is a plan view of the apparatus of FIG. 1;

FIG. 5 is a plan view of a portion of the control apparatus of this invention, showing in particular the control bar with the throttle and yaw control gripping handles;

FIG. 6 is a front view of the portion of the apparatus illustrated in FIG. 5 to further illustrate the roll control linkage means, shown in a position for no roll;

FIG. 7 is a view similar to FIG. 6, but illustrating the control bar in a tilted position, and the roll control means, in a position for imparting roll to the lunar vehicle or other object being moved by the thrust or engines;

PREFERRED EMBODIMENTS OF THE INVENTION

Figure 3:
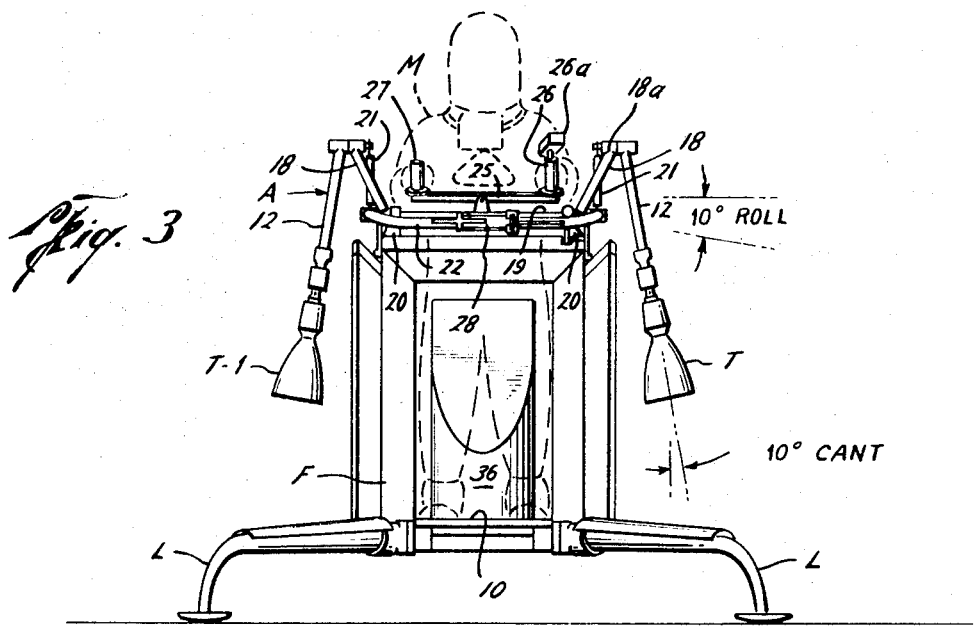
FIG. 3 is a front view, in elevation, of the apparatus of FIG. 1.

In the drawings, the letter A designates generally the thrust control apparatus of this invention which is adapted to be used in conjunction with a plurality of small rockets or jet thrust engines T and T-1 which are suitably mounted as will be explained in detail hereinafter, on a structural frame F of a lunar vehicle, or any other air or spacecraft or object. The frame F includes a base platform 10 which is adapted to receive a man M for operating the control apparatus A, as will be more evident hereinafter. The lunar vehicle or object has a plurality of legs L connected to the frame F, such legs being of any suitable construction or configuration to enable the object or craft to land upon any surface such as the surface of the moon. As will be explained hereinafter, the apparatus A of this invention makes it possible for the man M to operate the apparatus A with a minimum of training and technical know-how, while obtaining all of the necessary throttling, pitch, yaw and roll movements of the vehicle or craft.

Considering the invention more in detail, reference is first made to FIGS. 1–4, and FIG. 4 in particular, wherein the means for pivotally mounting the thrust engine T on the vehicle frame F is illustrated. The pivotal support means for the engine T includes a first thruster arm 12 which has its lower end pivotally connected at 12a to a bell crank 14 which has one horn thereof connected to the upper end of the thrust engine T. The other horn 14a of the bell crank 14 is connected to a control cable 15, preferably of the type known as a "Bowden" cable, for yaw control, as will be more fully explained.

The upper end of the first thruster arm 12 is connected to a second thruster arm 17 so that the thruster arms 12 and 17 form a second bell crank which pivots about a pivot pin or rod 16. The pivot pin or rod 16 extends through a sleeve 18a on the upper end of a support tube 18 which is pivoted at an intermediate sleeve or bearing 18b on a pivot rod 19. The pivot rod 19 is fixed to the frame F and is also supported thereon by spaced sleeve bearings 20 (FIGS. 2 and 3).

The outer end 17a of the second thruster arm 17 is pivotally connected to the upper end 21a of a drag link 21. The lower end 21b of the drag link 21 is pivotally connected to the rearward end 22a of a controller arm 22 which preferably is in a substantially U-shape (FIG. 2). The controller arm 22 is pivotally mounted on the pivot rod 19 at spaced bearings 22b. Thus, pivotal movements of the controller arm 22 about the bearings or pivot sleeves 22b are transmitted through the drag link 21 to the thruster arms 17 and 12 to thereby pivot the thruster engine T about the pivot pin 16 on a predetermined plane. For example, that plane may have about a 10° cant with respect to the vertical or longitudinal axis of the frame F (FIG. 3), so as to divert the hot expanding rocket exhaust away from the base of the vehicle, while at the same time keeping the controller mechanism 18, 21 compact.

The lower end 18c of the support tube 18 is provided with an eye through which a suitable locking pin 18d is adapted to be positioned. The locking pin 18d may be positioned in any one of a plurality of holes or openings 23 so that the support tube 18 can be locked with the locking pin 18d through any one of such holes or openings 23. Thus, the thruster engine T may be shifted by changing the location of the lower end 18c of the support tube 18 to provide a trim adjustment for the lunar vehicle or craft, depending upon the payload or load distribution of the vehicle. For example, if there is no payload on the craft, the thruster engine T may be positioned as shown in the solid lines in FIG. 4, whereas with a payload of approximately 370 pounds, the thruster engine T is shifted to the dotted line position of FIG. 4. For loads in between, the thruster engine T is positioned at points in between the solid line position and the dotted line position of FIG. 4.

The thruster engine T-1 is pivotally mounted on the frame F in the same manner as described in connection with the thruster engine T and therefore, like parts bear like numerals and/or letters for the mounting of the two thruster engines T and T-1. It is to be noted that the controller arm 22 extends from one side of the vehicle to the other and serves to operate the thruster units T and T-1 simultaneously, as will be more evident hereinafter.

Figure 8:
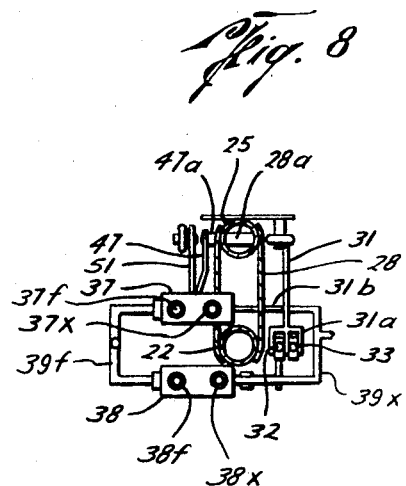
FIG. 8 is a view taken on line 8—8 of FIG. 6 to further illustrate the apparatus shown therein.
Figure 9:
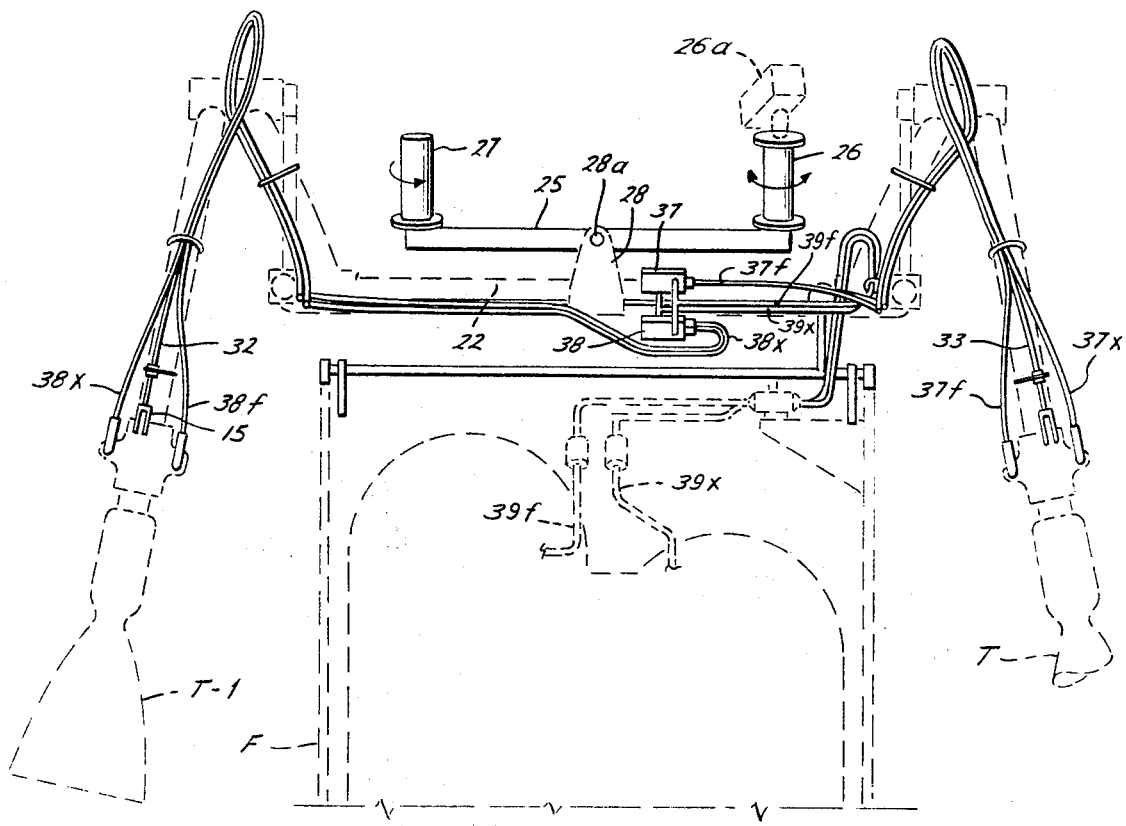
FIG. 9 is a front elevational view of the control apparatus of this invention, illustrating the propellant lines and the mechanical yaw control cables to the thruster engines in solid lines, and the remainder of the apparatus essentially in dotted lines.
Figure 10:
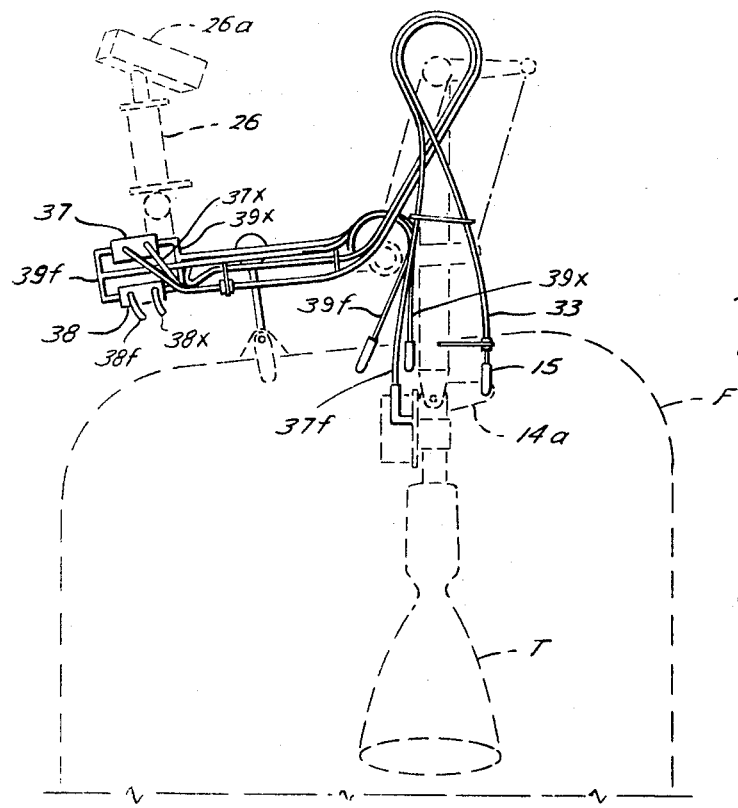
FIG. 10 is a side view of the apparatus of FIG. 9 to particularly illustrate in solid lines the propellant lines to the thruster engines and the yaw control cables or linkages thereto.

For controlling the pitch movements of the vehicle or craft about its pitch axis, the controller arm 22 is preferably connected to a control bar 25 which has a hand grip 26 for the left hand of the man M and a hand grip 27 for the right hand of the man M. An instrument display 26a is preferably disposed at the left hand grip 26, and such display is of any known construction for indicating the various attitudes and other information with respect to the craft. The control bar 25 is pivotally connected to the controller arm 22 through a suitable bracket 28 having a pivot pin 28a extending therethrough and through the control bar 25. The lower part of the bracket 28 is welded or is otherwise secured to the controller arm 22 (FIGS. 8 and 9).

With the apparatus illustrated in the drawings, a change in the pitch may be made from plus or minus 12° with respect to a vertical direction (FIG. 1). It should be noted that even if the control bar 25 is pivoted relative to the controller arm 22 to a position such as shown in FIG. 7, the downward and upward movements of the control bar 25 are transmitted through the controller arm 22 to the thruster engines T and T-1 so that the pitch control is obtained with respect to the vehicle or craft regardless of the relative position of the control bar 25 with respect to the controller arm 22.

Figure 4:
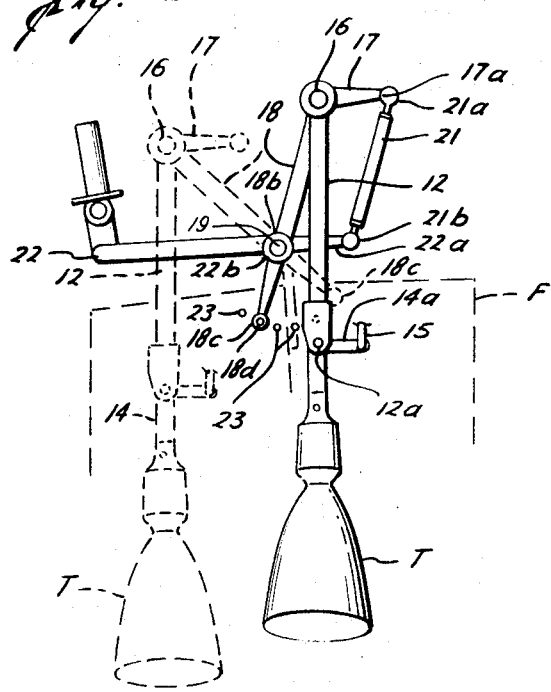
FIG. 4 is an elevation of a portion of the thrust control apparatus of this invention, with the thrust engine shown in solid lines and in dotted lines to illustrate two different payload positions of such apparatus.

The grip 26 which is engaged by the left hand of the operator M is rotatably mounted so that it can move from a center position 15° to either side thereof (FIG. 5). The extent of such movement should, however, not be considered a limitation on the operation of the yaw control means. A disc or plate 26b is integral or is connected with the grip 26 and it has a pivotal connection 26c to a link or rod 30 which is pivotally connected at 30a (FIG. 5) to a yaw input link 31 (FIG. 8) which has a double clevis 31a at its lower end for pivotal connection to a pair of Bowden cables 32 and 33 (FIGS. 5 and 8). The input link 31 is pivotally connected to the bracket or support 28 by a pivot pin 31b so that when the grip 26 is turned, so as to move the link 30, the input link 31 is pivoted about the pivot pin 31b to cause a movement of the ends of both of the cables 32 and 33 in opposite directions. Thus, as viewed in FIG. 5, when the grip 26 is turned clockwise, the link 30 is moved to the right, and such movement to the right causes a pivoting of the link 31 so as to move the ends of both cables 32 and 33 to the left, 32 being pushed and 33 being pulled. The cable 33 is suitably supported so that its outer end extends to the horn 14a on the bell crank 14 connected to the thruster enging T, where it is connected by a clevis 15 or any other suitable connecting means. The cable 32 extends to the thruster engine T-1 and it likewise is connected to the horn 14a of the bell crank 14 through a clevis 15 or other suitable connecting means (FIGS. 4 and 9). Since the cables 32 and 33 are thus operated independently of the movements of the controller arm 22, and since the end movements of such cable arms 32 and 33 are in opposite directions, the thruster engines T and T-1 are moved in opposite directions upon a turning or rotational movement of the yaw control gripper 26. Thus, in the example heretofore given, when the gripper 26 is moved in a clockwise direction, the cable 33 is moved to the right, and that causes the bell crank 14 to be pivoted in a counterclockwise direction as viewed in FIG. 4 which pivots the thruster engine T to the rear. Simultaneously, the cable 32 causes the thruster engine T-1 to be pivoted forwardly a substantially equal amount so that a thrust couple is developed which tends to move the vehicle or craft about its yaw axis in a clockwise direction as viewed from above the vehicle (FIG. 2). A counterclockwise turning movement of the grip 26 will produce an opposite movement of the thruster engines T and T-1 so as to produce a thrust couple about a yaw axis of the craft or vehicle in a counterclockwise direction as viewed from the top of the vehicle or craft (FIG. 2). It can thus be seen that movements of the vehicle or craft with respect to its yaw axis are controlled solely by the movements of the grip 26 for the differential rotation or pivoting of the engines to impose a force couple in the direction desired for the movement of the craft or vehicle about the yaw axis. It is to be noted that the extent of pivoting of each of the thruster engines T and T-1 is preferably 5° (FIG. 1) with respect to vertical or normal, although the invention is not to be limited thereto.

A throttle control system is provided with the apparatus A for controlling the magnitude of the thrust force from the thrust engines T and T-1. Preferably, the propellant employed for the engines is supplied to lines 39f and 39x from one or more tanks (not shown) which are suitably supported and mounted side by side on the platform 10. Other related equipment such as propellant pressurization tanks and regulators (not shown) are preferably in a compartment 36 (FIGS. 1-3) at the forward end of the frame F. Typically, the engines T and T-1 are of the bipropellant type so that two lines 39f and 39x, for the fuel and oxidizer, respectively, conduct propellant from suitable tanks to the throttling units 37 and 38 (FIGS. 5–10). Each of throttling units 37 and 38 comprises fuel and oxidizer regulator sections controlled by respective valve stems 37b and 38b. Throttling units 37 and 38 are of conventional design wherein the internal propellant flow passages, in unit 37 for example, for the oxidizer section are matched to the flow passages of the fuel section so that when the valve stems 37b of the respective sections are axially displaced relative to the throttling unit housing by identical increments, only the total propellant charge is changed, the fuel-oxidizer combustion ratio remaining the same for all settings. Accordingly, valve stems 37b are connected to a clevis or common connector 40 so that both of the stems 37b are operated simultaneously. The throttling valve 38 has similar valve stems 38b which also move longitudinally with respect to the valve 38 and likewise operate in the conventional manner to control the throttling internally in its housing. The valve stems 38b are also connected to a common clevis or connector 41 so that the stems 38b are operated simultaneously. The clevis 40 and 41 are pivotally connected at 40a and 41a to parallel throttle links 42 and 43, respectively, which in turn, are pivotally connected at 42a and 43a to a rigid T-shaped connector 45. The central leg 45a of the T-shaped connector 45 is pivotally connected at 45b to a differential roll link 47, the purpose of which will be hereinafter described. The upper end of the differential roll link 47 is pivotally connected at 47a to the control bar 25 (FIGS. 5, 6 and 8).

The bottom or outer end of the central leg 45a of the T-member 45 is also connected at the pivot 45b to a drag link 50 (FIG. 6) which has its other end pivotally connected at 50a to a throttle link 51 which extends parallel to the differential roll link 47 so that the links 47, 50 and 51 form a parallelogram linkage. The throttle link 51 is pivotally connected to the bracket 28 by the pivot pin 31b (FIGS. 5, 6 and 8), or by any other suitable pivot means which extends through the bracket 28. The upper end of the link 51 is not connected to the control bar 25, but it is pivotally connected to a throttle rod 52 at a pivotal connection 52a, which throttle rod 52 is also connected to a cam plate 27a by means of a connector pin 27b which extends through the end 52b of the throttle rod 52. The grip 27 is for throttle control and it is rotatable, preferably for 15° from each side of a central position (FIG. 5) so that an operator may control the propellant being supplied to the thrust engines T and T-1 by relatively short turning movements of the grip 27.

A throttle force compensating spring 55 (FIGS. 5 and 6) is mounted under compression between the cross member 45c of the T connector 45 and a plate 56 which is secured to the controller arm 22. An adjustable attachment 56b is provided for attaching the rod 55a and its flange 55b to the controller arm 22 so that the amount of force imparted to the T connector 45, the links 42 and 43, and thus to the valve stems 37b and 38b may be regulated in the known manner to compensate for the pressure of the propellant within the valves 37 and 38. As will be explained hereinafter, the connection of the rod 55a to the cross member 45c is a pivotal connection, preferably with a central sleeve which fits about the rod 55a so that the connector 45 may turn relative to the rod 56a as demonstrated by a comparison of FIGS. 6 and 7.

For controlling the throttling of the valves 37 and 38, the grip 27 is turned in either direction from a central position (shown in FIGS. 5 and 6). For example, if the grip 27 is turned in a clockwise direction as viewed in FIG. 5, the throttle rod 52 is moved to the left, which causes a pivoting of the throttle control link 51 about its pivot axis 31b in a counterclockwise direction as viewed in FIG. 6. Such rotational movement of the link 51 causes a movement of the T connector 45 to the right as viewed in FIG. 6, which pulls both of the links 42 and 43 simultaneously to the right to thereby move the valve stems 37b and 38b to the right to thereby change the valve setting internally of the valves 37 and 38 to increase the amount of propellant being supplied to the thrust engines T and T-1.

When the grip 27 is rotated in a counterclockwise direction as viewed in FIG. 5, the reverse action takes place so that the throttle link 51 is rotated in a clockwise direction to push the T connector 45 to the left as viewed in FIG. 6, which moves the valve stems 37b and 38b to the left to thereby decrease the amount of propellant supplied to the thruster engines T and T-1. It is to be noted that during such throttling action, the differential roll link 47 pivots, but has no effect upon the throttling action. Such link 47 does, however, serve to set the ratio of movement of the valve stems 37b and 38b, as will be explained hereinafter in connection with the roll control apparatus.

For controlling the roll of the vehicle or craft, the ratio of propellant supplied to the thrusters T and T-1, respectively, is varied by physically tilting or pivoting the control bar 25 about the roll axis of the vehicle, or an axis parallel to such roll axis. Thus, it will be understood that when a greater thrust force is exerted by the engine T than is exerted by the engine T-1, a thrust couple force is developed about the roll axis of the vehicle in a direction tending to rotate the vehicle or craft counterclockwise as viewed in FIG. 3. Conversely, if the thrust force from the engine T-1 is greater than that exerted by the engine T, a thrust force couple is developed about the roll axis in a clockwise direction as viewed in FIG. 3. To obtain such differential thrust action by the engines T and T-1, the operator simply moves the control bar 25 in the direction in which he wants the roll or movement about the roll axis to occur.

For example, under normal conditions when no roll or movement about the roll axis of the vehicle is taking place, the control bar 25 is in the neutral or center position which locates the bar 25 substantially parallel to the controller arm 22 (FIGS. 3 and 6). Should the operator M decide to create a roll or a thrust force in a counterclockwise direction as viewed in FIGS. 3, 6 and 7, he moves the control bar 25 in that direction so that it assumes a position such as shown in FIG. 7. It is to be noted that when the control bar 25 is thus pivoted, the differential roll link is forced downwardly relative to the link 51, but remaining parallel thereto. Such downward movement of the link 47 lowers the pivotal connection 45b with the T-connector leg 45a so as to tilt the T-connector 45, which causes the upper link 42 to move to the right and the lower link 43 to move to the left relative to each other, whereby the positions of the valve stems 37b and 38b are likewise adjusted relative to each other as best seen in FIG. 7. Such movement of the valve stems 37b and 38b adjusts the ratio of propellant permitted to pass through the valves 37 and 38, respectively, and since the ratio is no longer a one to one, there is an unequal amount of propellant to the thruster engines. In the illustration of FIG. 7, the propellant supplied to the thruster T is increased and the propellant supply to the thruster T-1 is decreased to create a thrust couple about the roll axis of the vehicle in a counterclockwise direction as viewed in FIGS. 3 and 7 to thereby correspond with the movement of the control arm 25 in such clockwise direction.

When it is desired to obtain a reverse roll movement to that described in connection with FIG. 7, the control bar 25 is pivoted about pivot pin 28a (FIG. 9) so that the right hand end of the bar 25 is lower than the left hand end, which causes the link 47 to move upwardly relative to the link 51 to thereby cause the T-connector 45 to pivot upwardly rather than downwardly as viewed in FIG. 7. Therefore, the upper link 42 is moved to the left and the lower link 43 is moved to the right which similarly moves the valve stems 37b to the left and the valve stems 38b to the right, whereby a greater thrust force is obtained from the thrust engine T-1 than is obtained from the thrust engine T to thereby create a force couple about the roll axis in a clockwise direction, which is the same as the clockwise direction of movement of the control bar 25.

It should be noted that when the control bar 25 is pivoted in either direction relative to its neutral position of FIG. 6, the throttle grip 27 is operable independently of such position of the control arm 25 so as to adjust simultaneously the total magnitude of propellant supplied to both thrust engines T and T-1, but the ratio or division of that total magnitude between the engines is determined by the position of the control arm 25.

The operation of the lunar vehicle or other object which is controlled by the control apparatus A of this invention is extremely simple as compared to known electronic flight control systems. Thus, the operator M initially adjusts the position of the thrust engines T and T-1 relative to the frame F by pivoting the support tube 18 for each of such engines and then locating the locking rod or pin 18d in one of the holes 23. The particular location for each of the engines T depends upon the amount of payload and its distribution on the frame F, which can be predetermined so that the proper trim for the vehicle in flight may be obtained.

The vehicle is capable of vertical take-off since the engines T and T-1 are mounted for a downward thrust. When the vehicle is in flight, the pitch of the vehicle may be controlled by the operator moving his hands either downwardly or upwardly. The moving of the hands downwardly produces a nose-down pitch command, whereas the moving of the hands upwardly produces a nose-up pitch command. Such movements are accomplished by the operator simply gripping the grips 26 and 27 and thereby moving the control bar 25 and the controller arm 22 in such upward or downward movements so as to effect a pivoting about the pivot rod 19.

The yaw or lateral movements of the vehicle are controlled through the grip 26 as previously explained. The roll movements of the vehicle are obtained by the pivoting of the control arm 25 about the pivot axis of the vehicle, or the roll movements of the vehicle or craft about its roll axis are obtained by a pivoting of the control bar 25 about its pivot axis 28a, as previously explained. The pivoting of the control bar 25 causes a differential throttling of the two thrust engines T and T-1 so that the roll control is obtained without any mechanical movement of the thrust engines themselves. While the other controls for the movements of the craft are being manipulated, the throttle control or grip 27 may be manipulated completely independently of the rest of the controls to determine the magnitude of the thrust obtained from the two engines T and T-1. In fact, the operator may simultaneously utilize the yaw control, the throttle control, the pitch control, and the roll control mechanisms to obtain the desired attitude and speed of movement of the vehicle or craft.

It should be noted that the directions of movements of the grips 26 and 27, and the control arm 25, are merely exemplary, since many variations are possible. For example, a rotation of the throttle grip 27 in a counterclockwise direction (FIG. 5) could reduce the amount of propellant supplied to the engines T and T-1 by suitable mechanical re-arrangement as will be apparent to those skilled in the art. Thus, the present invention is very versatile in operation.

The foregoing disclosure and description of the invention is illustrative and explanatory thereof, and various changes in the size, shape and materials as well as in the details of the illustrated construction may be made within the scope of the appended claims without departing from the spirit of the invention.

I claim:
1. Apparatus for controlling roll, pitch and yaw movements of an object in air or space, comprising:
   a movable object having a structural frame for receiving a person and having a roll axis, a pitch axis and a yaw axis;
   a thrust producing engine disposed on each side of said roll axis;
   pivot support means pivotally securing each of said engines to said structural frame for pivotal movement in a first predetermined plane;
   pitch control means operably connected with said pivot support means for codirectionally pivoting said engines in said first predetermined plane to control the movements of said object about said pitch axis;
   yaw control means operably connected with said engines for differentially pivoting said engines in a second predetermined plane to control the movements of said object about said yaw axis; and
   roll control means for varying the ratio of fuel to said engines to thereby vary the thrust from each engine relative to said roll axis for controlling the movement of said object about said roll axis.
2. The structure set forth in claim 1, including:
   pitch trim means for shifting said pivot support means relative to said frame to shift a first pivot axis of each of said engines to compensate for varying load distribution on said object.
3. The structure set forth in claim 1, wherein said pivot support means for each engine includes:
   linkage means having one end thereof pivotally connected to said frame for pivotal movement about said first axis substantially parallel to said pitch axis upon operation of said pitch control apparatus and the other end thereof pivotally connected to said engine for pivotal movement about a second axis substantially parallel to said pitch axis upon operation of said yaw control apparatus.
4. The structure set forth in claim 3, wherein:
   said linkage means includes a thruster arm and a support tube;
   means for pivotally connecting said thruster arm and said support tube;
   said pivotal connection of said linkage means to said frame includes a pivotal connection between said support tube and said frame for shifting said support tube and said engine therewith for selectively varying the location of said engine relative to said pitch axis for varying load distribution on said object; and
   locking means for locking said support tube in the selected position.
5. The structure set forth in claim 1, wherein:
   said engines constitute primary motive power for said object.
6. The structure set forth in claim 5, including:
   throttle control means for supplying fuel to said engines for controlling the thrust from said engines to thereby control the speed of movements of said object; and
   said throttle control means including means for changing the amount of fuel supplied to each of said engines in accordance with said ratio of fuel set by said roll control means.
7. The structure set forth in claim 1, including:
   a control bar pivotally mounted for pivoting about an axis parallel to said roll axis; and
   throttle control linkage means connecting said control bar to said roll control means for transmitting and converting clockwise and counterclockwise movements of said control bar into corresponding movements of said object about said roll axis.
8. The structure set forth in claim 7, including:
   a separate propellant throttling means for each of said engines; and
   roll linkage means forming part of said roll control means for adjusting said throttling means simultaneously for thereby adjusting the ratio of fuel passing therethrough to said engines.
9. The structure set forth in claim 8, including:
   throttle control means on said control bar, operable by one hand of an operator for regulating said throttling means to regulate the fuel passing therethrough to both of said engines independently of said roll control means.
10. The structure set forth in claim 1, including:
   a control bar; and
   means connecting said pitch control means to said control bar for transmitting movements of said control bar about said pitch axis to said pitch control means and thereby to said engines simultaneously for changing the pitch of said object in the direction corresponding to each direction of movement of said control bar about said pitch axis.
11. The structure set forth in claim 1, including:
   throttle control means for varying the fuel to said engines simultaneously;
   a control bar having a manual twist-grip control means thereon for operating by the hands of an operator positioned on the object and facing the control bar;
   one of said twist-grip control means forming part of said yaw control means; and
   the other of said twist-grip control means forming said throttle control means.
12. The structure set forth in claim 11, including:
   throttle control linkage means connecting said control bar to said roll control means for transmitting and converting clockwise and counterclockwise movements of said control bar into corresponding movements of said object about said roll axis.
13. The structure set forth in claim 12, including:
   means connecting said pitch control means to said control bar for transmitting movements of said control bar about an axis parallel to said pitch axis to said pitch control means and thereby to said engines simultaneously for changing the pitch of said object in the direction corresponding to each direction of movement of said control bar about said pitch control axis.
14. The structure set forth in claim 1, wherein said pivot support means includes a bell crank lever having a first thruster arm and a second thruster arm rigidly connected together, with a support tube having one end pivotally connected at the junction therebetween and its other end pivotally connected to said frame; and
   said pitch control means includes a controller arm pivotally connected to said frame, and a drag link having one end pivotally connected to said controller arm and its other end pivotally connected to said second thruster arm.
15. The structure set forth in claim 14, including:
   adjusting means for said support tube, including means for selectively pivoting same and locking it to said frame in selected positions for trim adjustment of the object to accommodate different load conditions on the object.
16. The structure set forth in claim 8, wherein said roll linkage means includes:
   a parallelogram linkage mounted on said frame for shifting in response to movements of said control bar about said roll axis;
   a rigid T-shaped bar pivotally connected at the bottom of its center leg to one of the links in said parallelogram linkage; and
   a throttle link for each throttling means having one end of each connected to an end of the top leg of said T-shaped bar.

* * * * *